United States Patent [19]
Jovanovic

[11] Patent Number: 5,316,323
[45] Date of Patent: May 31, 1994

[54] TWO-PART TOOL HOLDING FIXTURE

[76] Inventor: Victor Jovanovic, 5265 Burke St., R.R. #1, Windsor, Ontario, Canada, N9A 6J3

[21] Appl. No.: 2,018
[22] Filed: Jan. 8, 1993
[51] Int. Cl.$^5$ ............................................. B23B 31/107
[52] U.S. Cl. ......................................... 279/22; 279/76; 279/89; 279/905
[58] Field of Search ...................... 279/22, 30, 75, 905, 279/906, 19, 19.3-19.5, 76, 89; 408/226

[56] References Cited

U.S. PATENT DOCUMENTS

| | | | |
|---|---|---|---|
| 2,348,380 | 5/1944 | Graham | 279/76 |
| 4,512,692 | 4/1985 | Nielsen | 279/89 X |
| 4,824,298 | 4/1989 | Lippacher et al. | 279/905 X |

FOREIGN PATENT DOCUMENTS

| | | | |
|---|---|---|---|
| 2640767 | 3/1978 | Fed. Rep. of Germany | 279/22 |
| 542796 | 1/1941 | United Kingdom | 279/76 |

Primary Examiner—Steven C. Bishop
Attorney, Agent, or Firm—Mitches & Co.

[57] ABSTRACT

The tool holding cartridge is male and the second cartridge holding part is female and defines a cylindrical bore with diametrically opposed apertures near the forward face of the bore, the apertures carrying ball bearings, biased, so that a substantial portion of the ball bearing intersects and projects into the cylindrical bore. Those portions of the ball bearings that do so, act as a guide and locking means for the tool holding cartridge which has a cylindrical shaft which extends into a tool holding portion into which a tool may be anchored or secured, as may be required. The tool holding cartridge has, along the outer walls of the cylindrical portion thereof, near the proximate end of the cylindrical portion, a circumferential race that intersects with the proximate ends of two diametrically opposed axially oriented lead raceways defined in the outer perimeter of the cylindrical portion and that terminate at the outer shoulder and peripheral wall at distal end of the cylindrical portion.

11 Claims, 2 Drawing Sheets

TWO-PART TOOL HOLDING FIXTURE

This invention relates to a two-part tool holding fixture, wherein the first part is a tool holder cartridge that is removably secured into, preferably by mating relationship with another or second part of the fixture.

BACKGROUND TO THE INVENTION

There are many industrial processes and processing steps, particularly in machining and testing, that require the use a single tool or plurality of tools to operate either passively; or, as dynamically and active tool elements upon a workpiece. As an example of a passive tool application, consider a testing step subsequent to the cast fabrication of that portion of an internal combustion engine or engine block of a four-cycle reciprocating gasoline (petro) fuelled engine, which housing defines a plurality of cylindrical bores in which a combustion piston reciprocatingly travels during engine operation; and, as well, coolant chambers networking as the surrounding cooling water jacket for the passage of a coolant to keep the engine block cool.

When an engine block is cast in a casting furnace, either in steel, aluminum, or another metal or alloys thereof, after sand is removed from the casting and the outside surfaces, which will act as the bearing or sealing surfaces are machine ground smooth, it has been customary to test the engine block to see whether sand holes exist between cylinder bores, or between any one cylinder and the water jacket; the plurality of interconnected apertures, which of course are not supposed to communicate with any one of the cylinder bores. Typically, the "base" engine block is placed on a cradle and moved into a hydraulic press area which carries two or more plates, each with a plurality of passive seal holding tools, whose active surface is a resilient elastomer, acting as an elastomeric seal on each tool. The elastomeric seals are moved, by the hydraulic press, so as to overcover all the exposed apertures of the water jacket or the coolant chambers of the engine block; save and except for one inflow port to the water jacket system; or, alternatively save and except the outflow port thereof. Syr, under pressure, is injected into the engine block water jacket through one of these flow ports and elevated to a given pressure and sustained there for a period of time, normally 10 to 15 seconds and the pressure is monitored. If the pressure does not remain static, then there are pin holes in the water jacket structure allowing the bleeding of air out from the water jacket. The water jacket does not have integrity, and the engine block is sent back to the casting operation for re-melting and re-casting.

Similarly, each of the plurality of piston cylinder chambers is checked in subsequent testing steps.

Heretofore, when there is "leakage" at each or any one of the testing steps, it is really not known, with any true accuracy, whether the "leak" is as a result of pinholes through the casting walls or as a result of air leakage around the elastomeric membrane or seal when it is engaged, by the hydraulic press or ram, to overcover the orifices.

The reason for this is the simple tediousness of seal removal from the testing hydraulic press. The worker must contort his body to place himself beneath the plate holding the plurality of tool carrying seals in order to pry these seals out with a screwdriver. When one considers that in some instances, up to 55 or more elastomeric seals must be popped or pried out of the tool seal holder plate, the possibility of back injury for the worker is rather high. Further, the down time for the hydraulic press can be up to 18 to 30 hours to remove and replace all the seals in the machine. There are other applications where a tool holder, if easily removable, would have great application; namely, in polishing and grinding applications; in machine drilling operations; in tapping operations where a thread is tapped into an aperture.

It is therefore a general object of the invention to eliminate the stress of worker in replacing the tool holder element whether holding seals or drills or other tools, and to reduce substantially the down time in taking the tool holding elements out and replacing them with new tool holding elements which carry replacement tools whereby the required operation may be performed again with little or no down time for a press or other machine carrying the plurality of tool holding elements.

The invention therefore contemplates a two-part tool holding fixture wherein a first part is a removable tool holding cartridge that is simplistically removably secured into a mating relationship with another or second part of the fixture. One part of the fixture preferably is a male part, the other part a female part.

When the tool holding cartridge is the male part, the cartridge at one end has a tool holding portion into which the tool is affixed. The cartridge is then slid and turned to fit in, to lock, and to secure itself within the second or cartridge carrying part.

THE INVENTION

The invention therefore contemplates a two-part tool holding fixture comprising a first part, having means adapted for anchoring, affixing, and holding the same to a tool holding fixture base, the first part also adapted to be releasingly affixed to, a second part having means adapted to hold a tool, one of said parts defining a bore with a radially protrudingly finger, extending a predetermined distance into a portion of the bore and, the other part defining a cylindrical portion with distal and proximate ends, sized to the diameter of the bore, and defining a radial race near the proximate end thereof, and at least one axial race extending from the radial race to the distal end of the cylinder portion and having a depth at least as great as the predetermined distance, the radial race defining a depth less than that of the axial race and at an angle Θ relative to the axial race, an indentation adapted to engage the finger after the cylindrical portion has been inserted into the bore and turned relative thereto.

In particular, the first part defines an internal circumscribing annular channel whose inner wall defines a spherical recess that communicates, in part, with the bore, the recess sized to receive the ball bearing and an annular ring having an internal diameter adapted to snuggingly fit into the cylindrical channel and to overcover the ball bearing while leaving, when the ball bearing is fully nested into the recess and protrudes the predetermined distance into the bore, an outer annular space within said cylindrical recess whereby, when the ball bearing nests into the indentation of the other part, the annular ring is elliptically deformed.

Preferably, the annular ring is metallic and urgingly engages the outer surface of ball bearings, which are diametrically opposed to each other, to index a portion of the ball bearing into the bore the aforesaid predetermined distance, and the cylindrical portion of the other part as the radial race, either a preferred width, or width which is wider at the distal end of the cylindrical portion and narrower at its intersection with the radial race; the radial race at the intersection having a depth preferably the same as the axial race, and radially disposed recesses in the radial race 90° to that of the axial race.

In the preferred embodiment, the tool holding cartridge is male and the second cartridge holding part is female and defines a cylindrical bore with diametrically opposed apertures near the forward face of the bore, the apertures carrying ball bearings, biased, so that a substantial portion of the ball bearing intersects and projects into the cylindrical bore. Those portions of the ball bearings that do so, act as a guide and locking means for the tool holding cartridge which has a cylindrical shaft which extends into a tool holding portion into which a tool may be anchored or secured, as may be required. The tool holding cartridge has, along the outer walls of the cylindrical portion thereof, near the proximate end of the cylindrical portion, a circumferential race that intersects with the proximate ends of two diametrically opposed axially oriented lead raceways defined in the outer perimeter of the cylindrical portion and that terminate at the outer shoulder and peripheral wall at distal end of the cylindrical portion. The peripheral lead raceways are shaped and have a depth sufficient to slide axially by the ball bearings without urging against them, while the radial raceway has a shallower depth diameter requiring biasing against the ball bearings and urging them radially outward. In that respect, the cylindrical raceway has a three depth profile; a first deepest depth, that intersects with the lead axial peripheral raceways equal to those of those axial raceways, two first shallowest radial coplanar semi-circular raceways communicating at each end with and between each of the axial raceways thereby forming two interjoining semi-circular raceways or a single annular raceway of varying depth. In the radial or annular raceway, at an angle Θ, preferably 90°, to the axial raceways there are spherical recesses of a greater depth than the first shallowest depth, and preferably shallower than that of the axial raceways each having a radial diameter coincident with that of the ball bearings so that the ball bearings can index into and be cooperatively be held in the spherical recesses when the cartridge part is rotated 90° relative to the second part.

Thus, the cartridge may be simplistically twisted 90° and removed and a new cartridge with new tool inserted by reversing the process. The down time for the press machine, is rather small, less than several hours, even when 50 or more two-part tool fixtures, according to this invention are used in a single press and are to be replaced since it does not require a machine operator to expend more than 15 seconds to remove one tool holding cartridge and to replace it with a new tool holding cartridge. After all the spent tool holding cartridge have been removed from the press, they are returned to a bench station in the maintenance department of the plant whereby, if, and according to the preferred embodiment, the cartridges are seal holding cartridge elements, the seals may be punched out of the cartridge holder by another hydraulic press, in a manner as will be described hereafter, and similarly, by reverse process, a new elastomeric seal member may be pushed into its place. This removal and replacement of the elastomeric members in each cartridge, takes place without back strain; with the use of hydraulic tools and machines, and can be facilitated within two to three minutes per tool holding cartridge. A new replacement set of tool holding (seal carrying in the preferred embodiment), cartridges is thereby able to be held in reserve to be re-used during the next replacement cycle.

The aforesaid is accomplished even when the tool holding cartridge holds tools other than elastomeric seal members, as the preferred embodiment relates to.

In seal testing operations, according to the preferred embodiment, the tool or seal re-placement cycle takes place about once every thousand testing cycles.

BRIEF DESCRIPTION OF THE DRAWINGS

The invention will now be describe by way of example and reference to the accompanying drawings in which.

PREFERRED EMBODIMENT

A two-part fixture (10), according to the invention, consists of a first, male tool holding cartridge, part (20), and a second, female receiving and cartridge holding, part (30).

Figure 2:
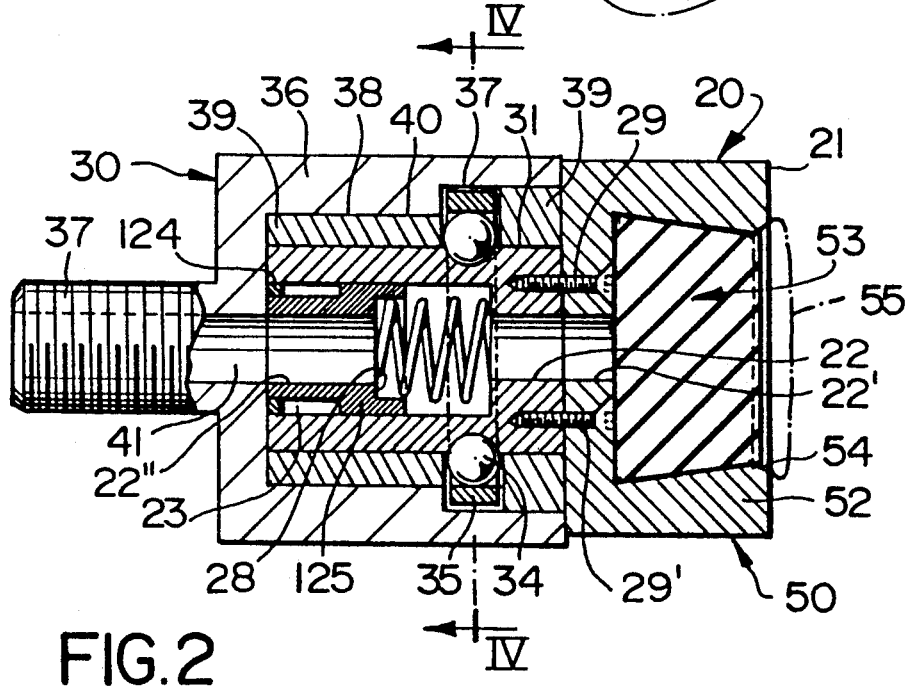
FIG. 2 is, in part, an assembled diametrical section of the two-part fixture, according to FIG. 1.

The female cartridge holding part (30) defines a cylindrical bore (31) with, near its forward distal end, that is shown in the assembly of FIG. 2, abutts with a collar portion (21) of the male cartridge part (20); a pair of diametrically opposed spherically ground, from the outside, apertures (33) each carry a ball bearing (34), under the bias of a circumscribing annulus (35). In that respect, the apertures (33) are spherically ground to define an aperture communicating with the cylindrical bore (31), with diameter sized approximately 33% to 45% of the outside diameter of the ball bearings (33) so as to allow part of the ball bearing to be seated in this recess, as more clearly seen in FIG. 2, and to be retained in that position by the circumscribing overlaying annulus (35), while the ball bearing itself protrudes, into the cylindrical bore (31), between 33% and 45% of its radial dimension. The female part (30) thus, is composed of an outer casing (36) having internal, first major and second minor bores, (37) and (38), into which slips a stepped cylindrical sleeve (39) having an outer major annular portion sized slightly larger than that of the inner major annular portion (37) and whose outer minor annular portion (40) is sized to that of the inner minor bore (38). It is the stepped sleeve (39) that defines the smooth inner bore (31) into which indexes the male portion (20). The casing (36) extends, at its opposite end, into a shaft for attachment to a machine, in this instance, the shaft is a threaded shaft (37) that threadingly mates into a threaded orifice within a support plate that multiplely carries a plurality of similar fixtures (10) and is attached to one or more hydraulic arms of a hydraulic press so that all the tools (10) are moved into and out of engagement with a workpiece, as is required.

In the outer walls of the two-step sleeve (39), the spherical recesses (33) are ground for seating of the ball bearings (34), as earlier described. The outside diameter of the annular ring or annulus (35) is slightly smaller than the inner major bore (37). In fabrication of the female part (30), the ball bearings (34) are slipped into the respective seats (33) and the annular ring (35) is slipped thereover and because the outside diameter of the major annular portion (40) of the two-part sleeve (39) is one micron or so larger in diameter than that of the inner major bore (37). Thus, a 35 hydraulic press can "press fit" the three pieces, ball bearings (34), ring (35) and stepped sleeve (39) permanently into the casing (36) and the outside surface (40) ground smooth. A permanent part (30) of the fixture (10) is thus obtained. In the preferred embodiment, it is desired that the threaded shaft (37) be hollow so as to define, through it, and through the bottom of the casing (36), as clearly seen in FIG. 2, a channel (41).

The tool male holding part (20) consists of a cylindrical portion (21) defining an access channel 22'therethrough which in fact, communicates with a minor bore (22) then with a major bore (23), as more clearly seen in the cross-section FIG. 2. The major bore (23) contains, under press fit, a circumscribing end annulus (24), that holds in the major bore (23), a reciprocating plunger (25) under biasing of a coil spring (26). The coil spring (26) seats against the forward wall of the major bore (23) and into a circular recess (28), defined in the forward end of the plunger (125). The plunger (125) defines, coaxially, the prolongation of channel (22) as channel 22". It communicates with and is sized the same diameter as that of channel (41) defined by female part (30). The upper end of the cylndrical portion (21) defines at least two threaded apertures (29) which are designed to accomodate securing screws or nuts, 29', which secure a tool holding element, generally indicated as (50), which in this embodiment consists of an elastomeric seal carrying element, a base portion and an annular portion (52) having an internal tapered bore being generally a compound truncated conic (53) with, near its forward end, an obtuse circumscribing radially disposed inward bevel (54). In phantom in this figure is shown an elastomer seal (55) that is press fit therein, by hydraulic pressure, as will be explained, and whose outer diameter overflows the forward diameter of the seal holding orifice (53).

Figure 1:
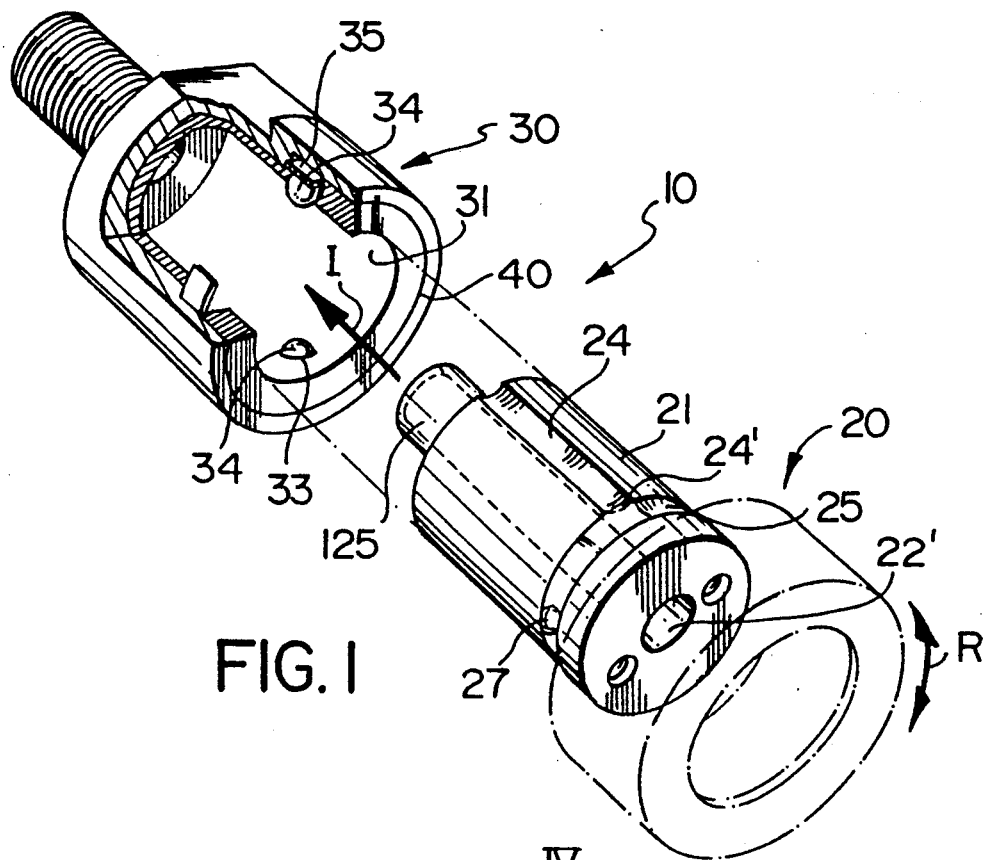
FIG. 1 is an assembly view of the two-part fixture, according to the invention.

Firstly, for assembly of the elastomeric seal, the male tool holding cartridge portion (20) is removed and placed in a press so that a cylindrical shaft, not shown, may be pushed down through the composite channel (22) against the back side of the elastomeric seal (55) by passing it through the injector sleeve, ring, bore (22) to the back side of the elastomeric seal (55), as seen in FIG. 1. Under pressure, the seal (55) "pops out".

The reverse process takes place in order to "pop in" a replacement seal (55) into the recess (53). The tool holding cartridge, in the embodiment just explained, is an elastomeric seal holding cartridge.

Referring now again to FIG. 1 and 2, the cylindrical portion (21) has two axially oriented diametrically disposed races (24), also hereinafter described as the axial lead races, that intersect, at the end face of the cylindrical portion (21) with the end surface thereof, and at its opposite other end, with a radial race (25). The intersection of the axial recesses (24) with a radial race (25) are at an elevation coincident with that of the axial races (24) and the axial race (24) have their depth such that when the tool holding cartridge (20) is indexed into the female holding portion (30), the ball bearings (34) slide, without any outward biasing force, along the races (24) and into the radial race (25) at the intersection, shown as zone (26). At an angle Θ, to the axial raceways (25), Θpreferably 90°, and within the radial race (25), are two diametrically opposed spherical recesses (27) whose depth is deeper than that of the radial race (25) but not as deep as the axial raceways (24). Preferably, the diametrically opposed spherical recesses (27) have a depth of approximately 25% to 30% of the radius of each ball bearing (34). In that regard, the depth profile of the cylindrical recess has three varying depths, that in region (24') being the deepest, that in spherical recesses (27) the next deepest, and the balance, the shallowest.

Figure 4:
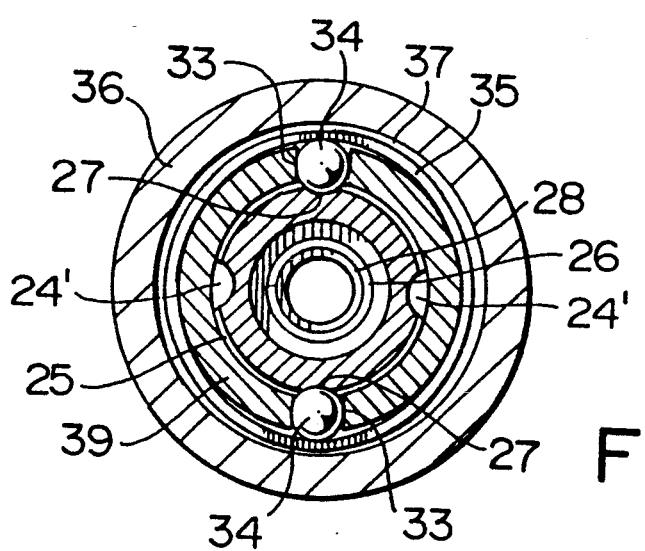
FIG. 4 is a cross-section along the line IV—IV, and through the radial race, of FIG. 2.

In order to index the male part (20) into the femal part (21), the axial races (24) are aligned over each of the ball bearings (34) and the male part moved in the direction of arrow I into engagement with the female part (30). on full indexing, a 90° rotation, either clockwise or counterclockwise, arrow R in FIG. 1 causes the respective ball bearings (34) to index into the spherical diametrically opposed recesses (27), as shown in FIG. 2 (see also FIG. 4). Securing of the tool, elastomeric seal (55) locking of the tool holder in the operative hydraulic press for testing purposes, in this embodiment, is achieved. It only takes a twist to insert or to remove, each operative tool.

The inner radius of the annulus (37) is selected so that it urges against ball bearings (34) when they are in their free open position, as shown in FIG. 1, or during the time that they are sliding along the axial lead raceways (24). Once turning takes place, in direction R, since the cylindrical raceway has a depth shallower than the extent by which the ball bearings protrude into the cylindrical bore (31), they are biased against by the bottom of the radial raceway (25) and urged outwardly against the annular ring (37) deforming into an elliptical shape which provides the inward biasing pressure thereon so that when the bearings (34) index over the spherical recesses (27), they are pushed by the elliptically deformed annulus (37) into the recesses and constrained there.

It will be apparent, that the tool holding part (52) may hold a tool such as an elastomeric seal, in the fashion disclosed, or be modified to hold another tool, such as a drill, a thread tap or the like.

Figure 3:
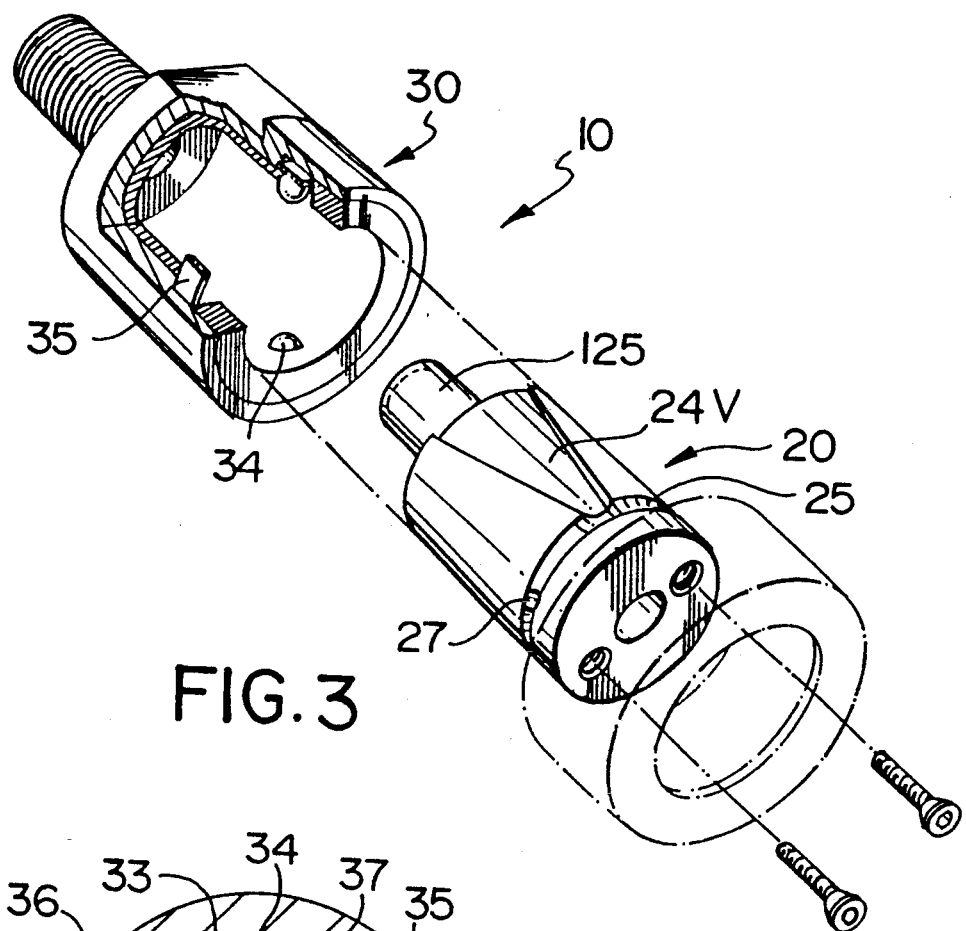
FIG. 3 is an assembly perspective of an alernative axial lead race profile for the two-part fixture.

Referring to FIG. 3, an alternative race is shown as a "V" race (24V) that allows self-index of the tool just by pushing the male portion (20) into the female portion (30), self-indexing the ball bearings (34) into the race (24V) into the intersect position (24') with the radial race (25).

I Claim:

1. A two-part tool holding fixture comprising:
   (a) a first part, having means adapted for anchoring, affixing, and holding the same to a tool holding fixture base, the first part also adapted to be releasingly affixed to,
   (b) a second part having means adapted to hold a tool,
   (c) one of said parts defining a bore with a radially protrudingly finger, extending a predetermined distance into a portion of the bore,
   (d) the other part defining a cylindrical portion with distal and proximate ends, sized to the diameter of the bore, and defining a radial race near the proximate end thereof, and at least one axial race extending from the radial race to the distal end of the cylinder portion and having a depth at least as great as the predetermined distance, the radial race defining a depth less than that of the axial race and at an angle $\theta$ relative to the axial race, an indentation adapted to engage the finger after the cylindrical portion has been inserted into the bore and turned relative thereto.

2. The fixture as claimed in claim 1, wherein the axial race has a fixed width.

3. The fixture as claimed in claim 1, wherein the axial race has a width, which is wider at the distal end and narrower at its intersection with the radial race.

4. The fixture as claimed in claim 1, including biasing means for biasing the finger into the predetermined distance.

5. The fixture as claimed in claim 1, wherein the protruding finger is a sector of a spherical ball bearing, including biasing means for biasing the ball bearing into the predetermined distance.

6. The fixture as claimed in claim 5, wherein the first part defines an internal circumscribing annular channel whose inner wall defines a spherical recess that communicates, in part, with the bore, the recess sized to receive the ball bearing and an annular ring having an internal diameter adapted to snuggingly fit into the cylindrical channel and to overcover the ball bearing while leaving, when the ball bearing is fully nested into the recess and protrudes the pre-determined distance into the bore, an outer annular space within said cylindrical recess whereby, when the ball bearing nests into the indentation of the other part, the annular ring is elliptically deformed.

7. The fixture as claimed in claim 6, wherein the annular ring is metallic.

8. The fixture as claimed in claim 1, including two oppositely radially disposed axial races and two diametrically opposed fingers.

9. The fixture as claimed in claim 7, including two radially disposed axial races, and two diametrically opposed spherical recesses defining ball bearings.

10. The fixture as claimed in claim 9, wherein the axial race has a fixed width.

11. The fixture as claimed in claim 9, wherein the axial race has a width, which is wider at the distal end and narrower at its intersection with the radial race.

* * * * *